May 28, 1968 J. L. MASURE ET AL 3,385,932

SELECTION SYSTEM FOR ELECTRICAL CIRCUITS HAVING MEMORY BLOCK MEANS

Filed Dec. 28, 1964 6 Sheets-Sheet 4

United States Patent Office 3,385,932
Patented May 28, 1968

3,385,932

SELECTION SYSTEM FOR ELECTRICAL CIRCUITS HAVING MEMORY BLOCK MEANS

Jean Louis Masure, Wilrijk-Antwerp, Belgium, and Pierre Rene Louis Marty, Paris, France, assignors to International Standard Electric Corporation, New York, N.Y., a corporation of Delaware Filed Dec. 28, 1964, Ser. No. 421,513
Claims priority, application Netherlands, Dec. 30, 1963, 302,736
10 Claims. (Cl. 179—18)

ABSTRACT OF THE DISCLOSURE

A selection system for systematically connecting a plurality of devices to common equipment. The system uses separate memory blocks which have compartments that are individually and temporarily associated with each of the devices to record all of the information characterizing the instantaneous status of the devices.

Figure 1:
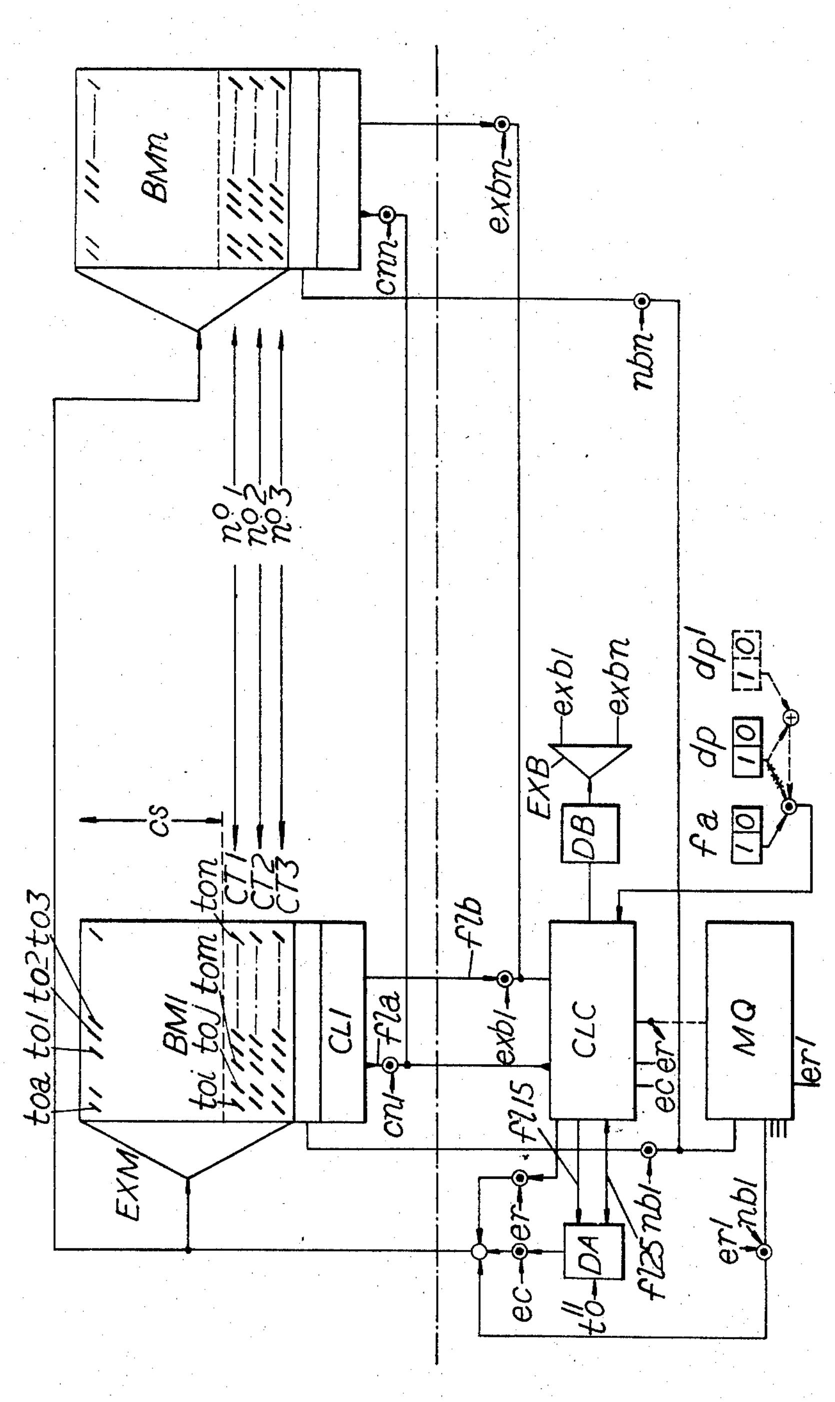

This invention relates to data handling or switching circuits and more particularly to selection systems for such circuits.

In some electronic system for data handling, switching or analogous systems, an assembly of similar devices is sometimes found which must be controlled and supervised from a central point. To this end, memory blocks are available which may be constituted for instance by ferite cores. Each of the devices is associated with a "compartment" in one of the memory blocks, so as to record all information characterizing its state at a given instant. A logic circuit successively scans these various memory compartments in a cyclic way; at each operation stage of the corresponding devices and assembles the information elements contained in the compartment as well as in the devices and commands the necessary operations accordingly. In these systems, it may be necessary to establish a communication between one of the memory compartments and common equipment. More often than not, such common equipment is not immediately available and the time allotted to the scanning of each compartment is very short so that it is impossible to wait for its availability. Hence, the invention proposes to realise a waiting row system according to which all the calls are noted chronologically to be then served in the inscription order.

The invention is more particularly applicable to automatic telephone systems. The U.S. Patent No. 3,242,265 which issued Mar. 22, 1966 and is assigned to the assignee of this invention concerns telephone switching apparatus of the semi-electronic type, i.e., using electro-mechanical switches for the speech circuit and electronic components such as diodes and transistors, for the command and control circuits. This patent particularly handled the "junctors and registers" part.

In the automatic switching system, described herein, the local or feed junctor inserted between the two selection chains on the calling and on the called side, has as essential functions the transmission of tones and ringing current, the feed of the subscriber's sets and the holding of the two chains. Of a simplified type, it comprises only the line conductors, the relays which transmit the various tones as well as the ringing current and the feed relays; the other functions usually performed by the feed junctor are carried over in common equipment made of electronic components. A certain number of memories constituted by ferrite cores are allotted to each feed junctor. A "sequential circuit" is provided whose position characterizes the operation stage of the system. Memory as well as elements are provided to record the states of the subscriber's line (open or looped line). A logic circuit common to a group of feed junctors, successively scans these feed junctors as well as the cores associated therewith. At each operation stage of a feed junctor, it takes note of the information given by the memories as well as by the contacts of the various relays and; derives therefrom all useful conclusions, commands the necessary operations and sets the memories up-to-date. The various feed junctors are cyclically scanned. The same logic circuit works successively on behalf of each of the following the feed junctors method known as "time division multiplex. The progession of the scanner giving access to the feed junctors is controlled by a chain of binary counters or "address distributor."

The orders promulgated by the logic circuit are recorded in an intermediate memory until the effective functioning of the corresponding relays. This memory may be common to several feed junctors and then as called "junctor driver."

The originating and terminating junctors are realized following the same principle used for the local or feed junctors. In the group serviced by a same logic circuit, one may find local, originating and terminating junctors.

It is not necessary that the feed junctor possess its own cores as in the preceding case. When a feed junctor is put into service, a plurality of cores or "memory compartment" may be temporarily associated thereto by inscribing its number in the said compartment; in this way the plurality of cores is used in a more rational way. When the logic circuit scans the compartment by means of a first scanner, it reads the number of the feed junctor and directs a second scanner on this feed junctor. It is then able to assemble all the information elements which it needs to make a decision. The various memory compartments grouped in "blocks" are scanned one after the other, in each block, in a cyclic way; on the other hand, the junctors are scanned on request of the logic circuit in accordance with the numbers read in the memory compartments.

In the U.S. patent application of H. Adelaar et al. filed Apr. 22, 1964, Ser. No. 361,692 and assigned to the assignee of this invention, a memory block is provided to serve a group of junctors and hence reduces traffic by grouping. An individual logical circuit particular to each block, explores in a cyclic way the various compartments of the block, but can only perform simple operations such as the reinscription of the information read. In complicated cases, it refers to a central logical circuit, common to all the blocks, which stops the scanning and does what is necessary. In this way, an economy is realised while preserving a reasonable duration for the scanning cycle.

It may be necessary to establish communication between one of these memory compartments and common equipment such as a marker, junctor driver, call charging device, automatic message accounting device. In such cases the "waiting" row system which is an object of the invention then finds an immediate application.

Accordingly, an object of this invention is to provide a system automatically selecting from a plurality of devices for connection to common equipment.

A related object of the invention is to provide a plurality of specialized so-called "transfer" compartments constituting a waiting store. The addresses of calling compartments are inscribed therein one after the other, in the order in which they present themselves, the calls are then served in the order of inscription.

A characteristic of the invention resides in using in each of the transfer compartments, memory elements to inscribe a mark therein and other elements to record the address of the calling compartment, several marks being foreseen, the first indicating an available compartment, i.e., which does not contain any address, the second indicating a busy compartment and a third characterizing a priority compartment, i.e., containing the first call inscribed and not yet served.

Another characteristic of the invention resides in the earmarking of a waiting store for each type of common equipment able to communicate with the memory compartments, e.g., marker, junctor driver, call charging device, automatic message accounting device, etc. . . ., which enables the calls to be served with the minimum of delay.

Another characteristic of the invention resides in arranging the various compartments of a same waiting store in analogous positions in the various memory blocks, which enables, by means of a same code, to simultaneously direct the scanners on the compartments of this waiting store and to read them all in one shot.

Another characteristic of the invention resides in providing in each of the compartments able to communicate with a common equipment, one or more memory elements to inscribe the number of the common equipment to be called as well as another element to indicate if the call has already taken a place in the waiting store.

Another characteristic of the invention resides in associating to the central logical circuit a block scanner able to accomplish a complete cycle from a marked position. The central logical circuit in this way, can successively test the marks of the waiting store compartments that are indicated on the read and write registers of the various blocks.

Another characteristic of the invention resides in the fact that when a memory compartment calls a predetermined common equipment and this call has not as yet taken a place in the waiting store, the individual logic circuit of the corresponding block refers to the central logic circuit which stops the cyclic scanning, directs the various scanners on the desired waiting store compartments, commands the simultaneous reading of all the marks, successively tests all these marks by means of the block scanner, and chooses the first free compartment which follows the already busy compartment or compartments. The chosen compartment is then seized and the address of the calling memory compartment, indicated in binary code on the address distributor, is recorded in the waiting store compartment.

Another characteristic of the invention resides in the fact that when the individual logical circuit calls the central logical circuit, the latter immediately acts upon the memory element of the supervision compartment provided to indicate the noted calls, as if the number of this compartment was already recorded in the waiting store. This arrangement avoids a return of the scanner on the compartment considered and thus enables a gain of time.

Another characteristic of the invention resides in associating an indicator essentially containing two bistables with each waiting store, one bistable indicates if there is at least one call pending in the waiting store, the other bistable marks the total occupation of this store. The arrangement is such that when the first bistable indicates an empty waiting store, the central logical circuit immediately seizes the first compartment of this store without calling on the block distributor, and brings it to the priority condition.

Another characteristic of the invention resides in the fact that when the second bistable indicates that the waiting store is completely busy, the central logical circuit again directs the scanner onto the calling compartment in order to reset the memory element provided for the calls already recorded in the waiting store, and commands the restart of the cyclic scanning. The call is served during one of the following turns as soon as an available place occurs in the waiting store.

Another characteristic of the invention resides in the fact that when common equipment becomes available and there is at least one call pending in the corresponding waiting store, the central logic circuit is alerted, which circuit stops the cyclic scanning, connects itself to the common equipment, directs the various scanners on the waiting store compartments, commands the simultaneous reading of all the marks, successively tests these marks by means of the block scanner and seizes the compartment containing the priority mark, the address recorded in said compartment being then communicated to the common equipment which thus possesses all the elements to communicate with the calling compartment.

Another characteristic of the invention resides in the fact that the central logic circuit after having seized the priority compartment, empties it of its contents and inserts an availability mark therein, the following compartment in turn receiving the priority mark in such a way that upon the common equipment or another common equipment of the same type becoming free, the second call is processed in the same way.

Another characteristic of the invention resides in the fact that the address of the calling member compartments is constituted by two groups of bits, the first group indicates the block containing the compartment and the second indicates the location of the compartment inside the block. The common equipment exploits the first group of bits to connect itself to the read and write register of the desired block and the second group to reach the compartment through the memory scanner.

Figure 2:
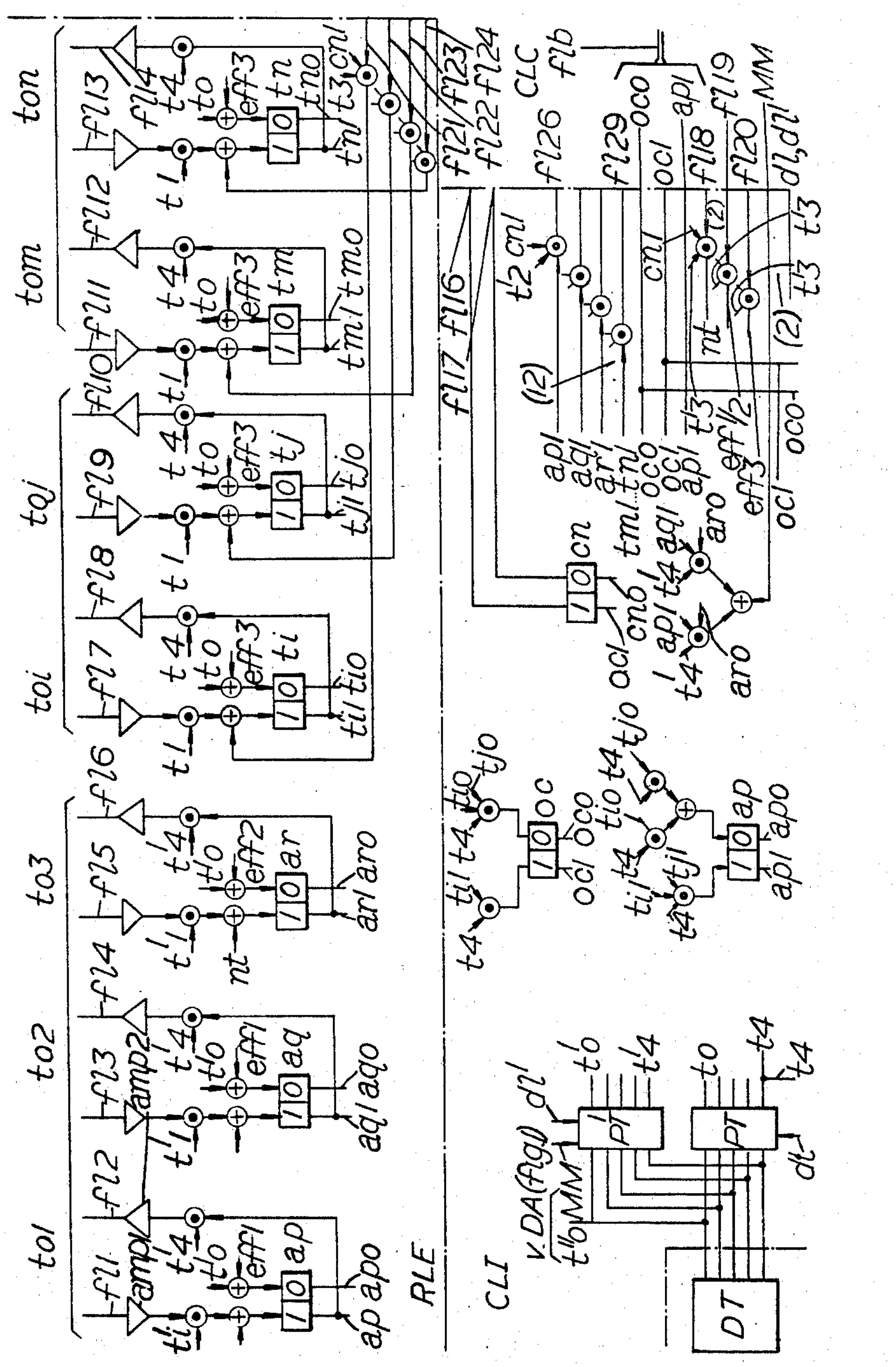
Figure 3:
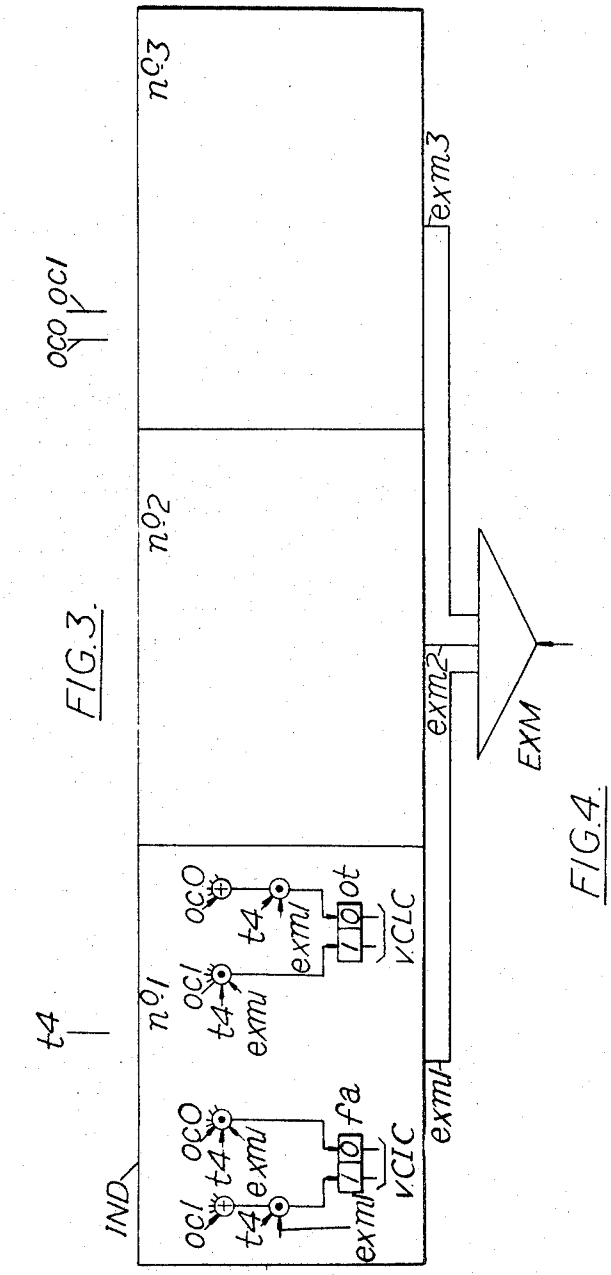
Figure 4:
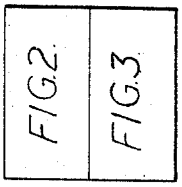
Figure 5:
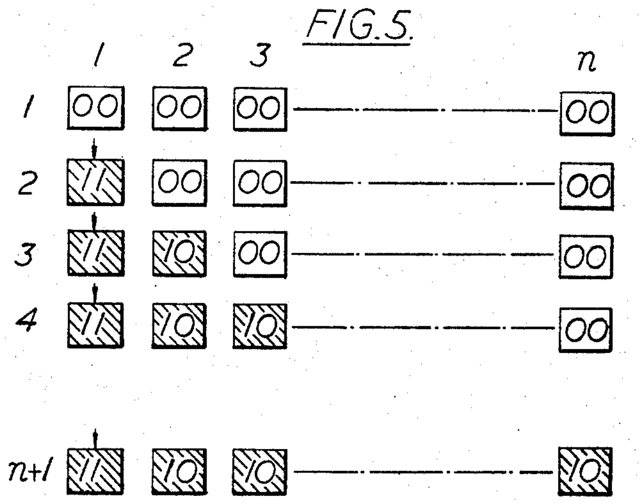
Figure 6:
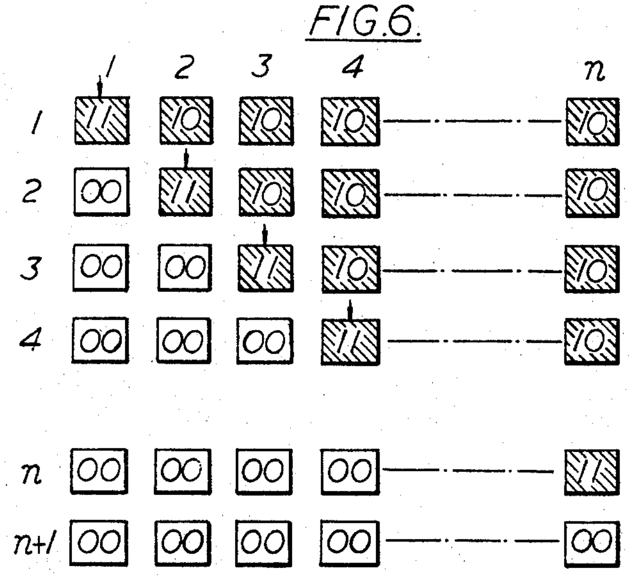
Figure 7:
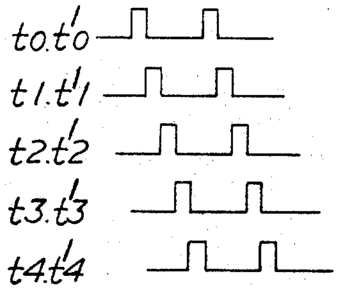
Figure 8:
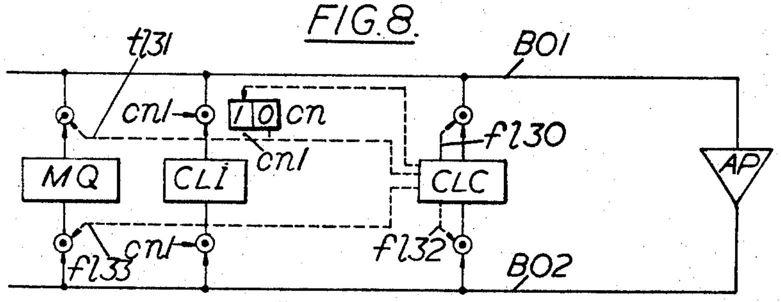
Figure 9:
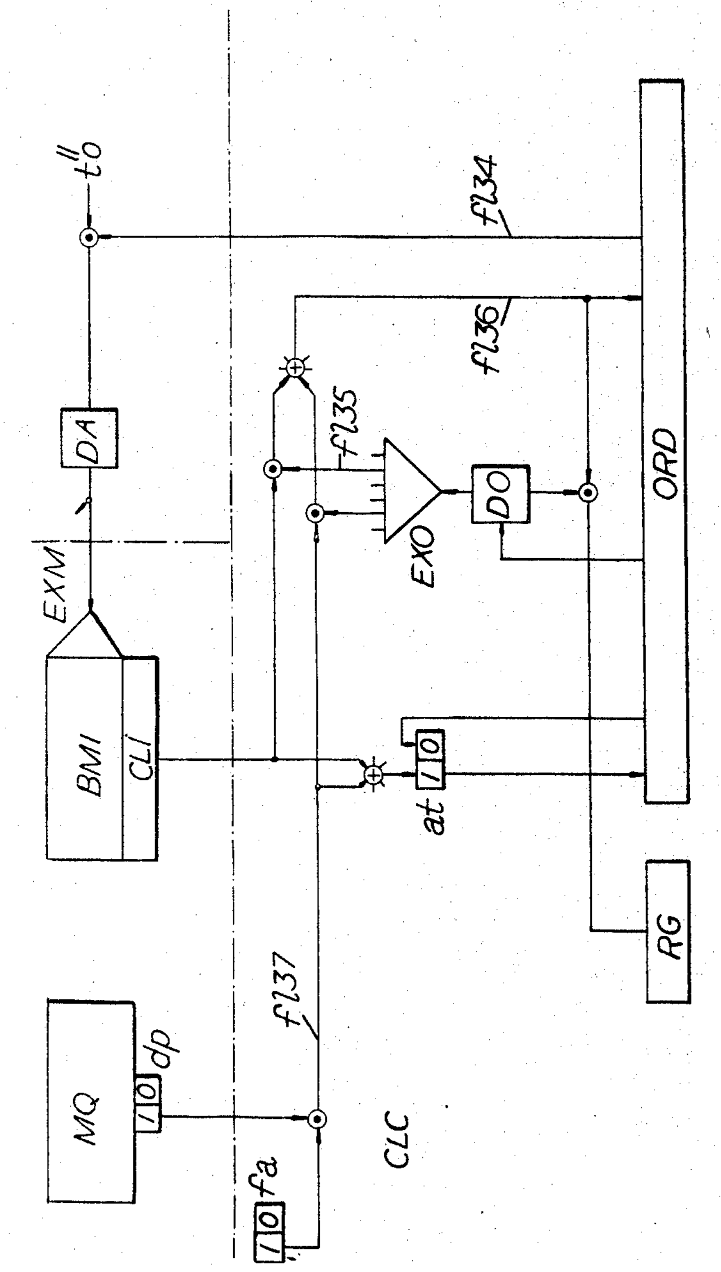

Various other characteristics will come out of the description which follows, given as a non-limitative example, and by referring to the attached figures, which represent:

FIG. 1, the general operation diagram of the system;

FIG. 2, the circuit elements, necessary for the understanding of the invention, of the read and write register and of the individual logical circuit of a memory block;

FIG. 3, the circuit elements of the waiting store indicators;

FIG. 4, the interconnection plan for FIGS. 2 and 3;

FIG. 5, a diagram illustrating the call inscription process in a waiting store;

FIG. 6, a diagram illustrating the process through which the calls are served in the order of their inscription;

FIG. 7, the diagram of the control pulses delivered by the time distributor;

FIG. 8, a simplified schematic indicating the way of interconnecting the various equipments of the installation through "busbars";

FIG. 9, an interconnecting diagram concerning the call distributing process to the central logical circuit.

SYMBOLISM

The ferrite cores used in the memory block have been represented by small oblique bars (FIG. 1, cores *toa*, *to1* *to2*, *to3*). Heavy lines have been used for the cores which are part of the invention and thin lines for the other cores.

The electronic scanner associated to each memory block (EXM) is represented by a triangle; the input corresponds to the apex marked with an arrow and the various outputs are arranged on the opposite side. The other scanners (EXB, FIG. 1, EXO, FIG. 9) are represented in a similar way.

Gates are figured by small size circles enclosing a point (AND gate) or a plus sign (OR gate) which representations are inspired from Boolean algebra.

The bistable circuits such as *ap* (FIG. 2) have been represented by two adjacent rectangles containing the digits 1 and 0. The input wires are placed at the upper part and carry an arrow indicating the direction of arrival of the control signal; the output wires *ap1* and *ap0* are placed at the lower part. Normally, this bistable stands in position 0, a characteristic potential (−12 v. for instance) being delivered on wire *ap0*. To set this bistable into position 1, a control signal is sent on the left input wire, the characteristic potential is then switched from wire *ap0* to wire *ap1*. To return the bistable to its initial position, a control signal is sent on the right hand wire.

The amplifiers (*amp* 1, *amp* 2, . . . *amp* 14) are represented by small size triangles.

Finally, the references between brackets and placed next to the wires, indicate the number of like wires.

GENERAL ARRANGEMENT OF THE EQUIPMENT

As soon as a junctor is put into service, a free memory compartment or supervision compartmentt such as CS is temporarily affected thereto (FIG. 1). This compartment is essentially constituted by a certain number of ferrite cores *toa, to*1, *to*2, *to*3. On the core *toa* and the following cores one finds in particular the availability or busy indication of the compartment, the number of the associated junctor, the indication of the operation stage (sequential instruction), the state of the calling subscriber's line (open or looped) and that of the called subscriber line. The various compartments such as CS constitute a memory block BM*l*. A telephone exchange may comprise several similar blocks BM*l* . . . BM*n*, each of those being associated with a predetermined junctor group.

As the junctors of a group are not all busy at the same moment the number of compartments of a memory block can be lower than that of the junctors. By way of example, one may constitute groups which may include as many as 384 junctors, which corresponds to a traffic of about 2,000 subscriber lines, each group being associated to a memory block of 250 compartments.

To simplify matters it has been assumed that there were only three common equipments liable to be connected with the memory compartment; one of those has been represented in an explicit way, i.e., marker MQ. In each supervision compartment CS, two cores *to*1, *to*2 are available, enabling 4 combinations to be obtained. Combination 01 corresponds to a call from the common equipment No. 1 (marker MQ); combinations 10 and 11 correspond to a call from common equipments No. 2 and 3 respectively; finally, combination 00 indicates that there is no pending call.

In each memory block a certain number of compartments, so called "transfer" compartments CT1, CT2, CT3 have been arranged to record the number of the supervision compartments which require common equipment. Transfer compartments of the various blocks which are arranged along a same horizontal line, i.e., which occupy homologous positions in the various blocks constitute a waiting row or store. In the described embodiment, three waiting rows or stores have been represented, each of which is associated with common equipment; in particular the waiting row No. 1 (CT1) corresponds to marker MQ. In a transfer compartment such as CT1 one finds two cores *toi, toj* enabling 4 combinations. Combination 00 indicates that the compartment is free; combination 10 indicates that the compartment is busy and contains an address of a supervision compartment calling a common equipment; combination 11 has the same significance but moreover indicates that the corresponding supervision compartment must be served before the others (priority seizure); combination 01 is not used in the invention. The cores *tom* . . . *ton* are foreseen to note the address of the supervision compartment which requires common equipment. To fix ideas it has been assumed that there are 4 cores to indicate the block number and 8 cores to indicate the supervision compartment address inside the block; this corresponds to a capacity of $2^4=16$ blocks and $2^8=256$ supervision compartments per block.

Core *to*3 of supervision compartment CS notes that the address of this compartment is already recorded in a transfer compartment.

To scan the various compartments of memory block BM*l* an address distributor DA is available and essentially constituted by a chain of several binary counters such as bistable circuits, each of which causing the next to advance by one step when it is returned to rest. In this condition $2^n$ combinations may be obtained by using only *n* binary counters. Pulses *t''o* ensure the advancement of the first counter of the chain. The binary indications delivered by the address distributor are decoded by any known means, such as diode or resistance matrices, in order to cause the appearance of a characteristic potential on a predetermined wire and only one for each position of the address distributor. This decoding device constitutes the scanner EXM. In general these scanning devices progress step-by-step under the control of other distributors, i.e., it scans the various memory compartments one after the other in a cyclic way, but it can also be directed on a predetermined compartment by means of a binary code transmitted by the central logic circuit CLC or the marker MQ.

The read and write register RLE is essentially constituted by bistable circuits; for each position of the scanner EXM, it provides the binary information which is read or which is to be inscribed in the corresponding compartment.

The logic circuit CLI is individual to each memory block. For each position of the scanner EXM it reads the indications provided on the register RLE. It can only perform simple operations and must call the central logic circuit in all other cases. The central logic circuit CLC (duplicated for security reasons) is common to all the memory blocks BM*l*–BM*n* of the exchange. It can be temporarily connected to one of them through a connection such as *fla*; it then reads all useful information elements, then elaborates the necessary instructions.

Scanner EXB, controlled by the address distributors DB, is constiuted like EXM; it enables the central logic circuit to successfully scan the various transfer compartments of a same waiting row by means of AND gates unblocked by conditions *exbl* . . . *exbn*.

On FIG. 2 have been represented the circuit elements, necessary to the understanding of the invention, of the read and write register RLE, of the individual logic circuit CLI; wires such as *fl*1 and *fl*2 located at the upper part of the figure are connected to the memory block. Wire *fl*1 is used for reading core *to*1 of the compartment designated by the scanner; wire *fl*2 is used to inscribe an information on this same core. Amplifiers *amp*1, *amp*2 are respectively inserted on these two wires. Bistable *ap* provides the binary information which is read or which is to be inscribed on that core. A similar arrangement is foreseen for the circuits corresponding to cores *to*2, *to*3, *toi, toj, tom* . . . *ton*.

The various operations which must be accomplished for every memory compartment are set by a timing distributor DT. The latter delivers pulses which are staggered with respect to one another (FIG. 7). Two pulse series have been shown: series *to* . . . *t*4 is used for transfer compartments, series *t'o* . . . *t'*4 is used for supervision compartments. Gates PT, PT' (FIG. 2) are shown and enable the flow of these various pulses. The pulse times *to, t'o* are allocated to the rest of the read and write bistables; the pulse times *t*1, *t'*1 are allocated to reading; the pulse times *t*2, *t'*2 are allocated to transmission of information towards the central logical circuit, the pulse times *t*3, *t'*3 are allocated to the receipt of instructions coming from the central logic circuit; finally pulse times *t*4, *t'*4 are reserved for inscription operations as well as a call for the central logic circuit.

Between the pulse time *t*2 when the central logical circuit receives some information and the pulse time *t*3 when it sends an instruction towards the individual logic circuit, it must accomplish various operations which culminate into the elaboration of the instructions. To this end, a complete cycle of the time distributor passed and there is thus available the pulse times *t*3, *t*4, *to*, *t*1, *t*2.

By way of indication, the duration of each of the pulses *to* . . . *t*4, *t'*0 . . . *t'*4 can be several microseconds. The address distributor DA (FIG. 1) makes a step at each pulse *t''o*, i.e., each time the time distributor DT starts a new cycle.

INSCRIPTION OF A CALL IN A WAITING STORE

It will be assumed that the topmost supervision compartment in CS (FIG. 1) indicates a request for common equipment No. 1, i.e., marker MQ; the respective indications inscribed on the cores *to*1 and *to*2 are then 0 and 1. It is also assumed that this call is not noted in the corresponding waiting store or row, that is, core *to*3 is at 0.

Scanner EXM advances step by step under the control of the address distributor DA. The latter acts on the scanner by means of an "AND" gate unblocked by the condition *ec* and by means of an "OR" gate; the *ec* condition is provided by the central logical circuit. During the passage of the scanner on each of the compartments, the control pulses *t*0 . . . *t'*4 (FIG. 2) are delivered by the time distributor DT through the gates PT'. When the scanner arrives at the level of the calling compartment, the individual logic circuit notes the state of the cores *to*1, *to*2, *to*3. At the instant *t'*0, one proceeds to the zero reset of the bistable *ap, aq, ar* through "OR" gates. At the instant *t'*1, the "AND" gates put on the reading wires *fl*1, *fl*3, *fl*5 are unblocked, in order to copy again the respective positions of the cores *to*1, *to*2, *to*3 (0, 1, 0) on the corresponding distables *ap, aq, ar*. At the instant *t'*4, the "AND" gates inserted on the reading wires *fl*2, *fl*4, *fl*6 are unblocked, in order to carry the position indications of the bistables *ap, aq, ar* on the corresponding cores *to*1, *to*2, *to*3; thus one limits oneself to the mere reinscription of the indications which have just been read. At the same time, the call of the central logic circuit CLC is proceeded with by sending a signal on the start wire MM through an "OR" gate unblocked by the conditions *t'*4, *aq*1, *ar*0.

The calling signal of the central logic circuit sent on wire MM is also used to block the gates PT', which suppresses the sending of control pulses *t'*0 . . . *t'*4.

The central logic circuit CLC (FIG. 1) stops the address distributor DA on the considered position (wire *fl*15). It serves other memory blocks, if needed, then connects itself to the considered block, it then makes the bistable *cn* go to 1 (FIG. 2) through wire *fl*16. By providing the condition *cn*1, this bistable prepares the circuit for the information exchange with the central logical circuit. The latter acts on the gates PT' through the unblocking wire *d*1, to reestablish the passage of the control pulses *t'*2, *t'*3, *t'*4 for the duration of one cycle of the time distributor DT.

In a general way, the control pulses *t'*0 . . . *t'*4 are continuously provided by the time distributor DT through PT', during the cyclic scanning; but, as soon as calling of the central logical circuit is proceeded with these pulses are suppressed in order to avoid any untimely change of position of the reading bistables. When the central logical circuit is connected to the individual logical circuit, it re-establishes all or part of these pulses, but only for a limited duration (one or two cycles of the time distributor).

At instant *t'*2, information concerning the respective positions of the bistables *ap, aq, ar* are sent to the central logical circuit through the wires *ap*1, *aq*1, *ar*1 and "AND" gates unblocked by the conditions *t'*2 and *cn*1. The central logical circuit deduces therefrom that the supervision compartment is calling the marker, that this call is not yet noted and has to take rank in the corresponding waiting store i.e., in the waiting row No. 1.

At instant *t'*3, the central logic circuit sends an order on bistable *ar* through wire *fl*18, and "AND" gate unblocked by the conditions *t'*3 and *cn*1, the wire *nt* and an "OR" gate; this bistable then passes to position 1. At instant *t'*4, this position indication is carried onto the corresponding core *to*3. It will be noted that core *to*3 is from now on set to 1 although the call has not yet taken rank in the waiting store; a later return to the supervision compartment is thus avoided and time is saved.

The central logic circuit is disconnected from the block considered by making the bistable *cn* pass to 0 (wire *fl*17); it then acts on the scanners EXM of all the blocks (FIG. 1) through an "AND" gate unblocked by the condition *er* and an "OR" gate, so as to direct them on the transfer compartments CT1 corresponding to the waiting row No. 1.

An indicator IND (FIG. 3) is associated with each waiting store. Each of them is constituted essentially by two bistables *fa, ot*. Bistable *fa* indicates if there is at least one call pending in the waiting store; bistable *ot* indicates the total occupation of the store compartments. It will first of all be assumed that there is no call pending, in other words that all the transfer compartments of the store are empty; the bistable *fa* is then in 0. The central logical circuit CLC, after having noted the position of the bistable, deduces therefrom that it has to occupy the first store compartment and mark it with "priority" status. It connects itself to block BM*l* which contains this compartment and makes the connecting bistable on (FIG. 2) pass to 1; at the same time, it acts on the gates PT through wire *d*1 to unblock the conditions *t*3 and *t*4 for the duration of one cycle of the time distributor.

At instant *t*3, the central logical circuit makes the bistables *ti, tj* pass to 1 through the wires *fl*21, *fl*22, "AND" gates unblocked by the conditions *t*3, *cn*1 and "OR" gates. At the same time, it reads the position of the address distributor DA (wire *fl*25, FIG. 1), which staticizes the address of the calling supervision compartment CS, then carries this address on the bistables *tm* . . . *tn* through wires *fl*23, *fl*24, "AND" gates unblocked by the conditions *t*3, *cn*1 and "OR" gates. As has been indicated, this address contains 12 bits, which necessitates 12 bistables *tm* . . . *tn*. At instant *t*4, "AND" gates put on the inscription wires *fl*8, *fl*10, *fl*12, *fl*14, are unblocked, so as to carry the position indications of the bistables *ti, tj, tm* . . . *tn* onto the corresponding cores *toi, toj, tom* . . . *ton*. The supervision compartment call has thus taken rank in the first waiting row compartment; the indication 11 carried on the cores *toi, toj* indicates that the call has priority, i.e., that it has to be served before all those which will be inscribed later in the row.

At instant *t*4, bistable *oc* is also made to pass to 1 through an "AND" gate unblocked by the conditions *t*4 and *ti*1; in the same way, bistable *op* is made to pass to 1 through an "AND" gate unblocked by the conditions *t*4, *ti*1, *tj*1. Bistable *oc* indicates an occupation of the transfer compartment; bistable *op* indicates a priority call. The output wire *oc*1 of bistable *oc* is on the one hand connected to the central logical circuit through connection *flb* and on the other hand to the indicator of the waiting row No. 1 (wire *oc*1, FIG. 3); this wire *oc*1 finally ends at one of the inputs of an "OR" gate put above bistable *fa*. The wires *oc*1 of the individual circuits of the other blocks also end at this "OR" gate. At the considered instant, the memory scanner EXM is in the position corresponding to the first waiting row and then delivers a condition *exm*1; the "AND" gate put underneath the "OR" gate previously mentioned is thus unblocked. In these conditions, bistable *fa* of the waiting row No. 1 passes to 1, thus indicating that there is at least one call in the row.

The central logic circuit serves other requests, if necessary, then controls the restart of the cyclic scanning. To this end, it suppresses condition *er* (FIG. 1), re-establishes condition *ec* and causes the start of the address distributor DA (wire *fl*15). The control pulses *t'*0 . . . *t'*4 foreseen for the normal operation of the supervision compartments are again delivered through gate PT', starting of course, with *t'*0.

The various particular cases relative to the inscription of calls will now be treated and it will first be assumed that the first transfer compartment of the waiting row is busy when a call occurs, the second case being free. When consulting bistable *fa*, the central logical circuit knows that there is at least a call pending in the row but does not have any indication on the compartment(s) which may be available. One is thus compelled, in that case, to read the contents of all the row compartments and to scan successively the information provided on the read and write registers.

After having controlled the setting of the various memory scanners EXM on the azimuth corresponding to the waiting row No. 1, the central logical circuit CLC acts on the gates PT of all the individual logical circuits CLI, by means of the wires *d*1 to unblock the conditions *t*0 . . . . *t*4 but only during the duration of one time distributor cycle DT.

In the memory block BM*l*, the operation is then as follows. At instant *t*0, one proceeds with the reset to zero of the bistables *ti, tj, tm . . . tn*. At instant *t*1, the "AND" gates inserted on the reading wires *fl*7, *fl*9 are unblocked so as to copy again the conditions of the cores *toi, toj* on the corresponding bistables *ti, tj*. At instant *t*4, "AND" gates put on the writing wires *fl*8, *fl*10 are unblocked in order to carry the position indications of the bistables *ti, tj* onto the corresponding cores *toi, toj*; in other words, the indications which have just been read are merely re-inscribed. As the first transfer compartment is assumed to be "priority" busy, bistables *tl, tj* are both in position 1; then the passage to 1 of the bistables *oc, op* is caused as previously indicated. The gates PT are then blocked, in order to suppress the control pulses *t*0 . . . *t*4 and to avoid afterwards any change of position of the reading bistables *ti, tj*.

Similar operations take place in the various memory blocks, at least with respect to the corresponding coils and bistables. As all the compartments of the waiting row other than the first are assumed to be free, the bistables *ti, tj* of the corresponding blocks remain in position 0. In the individual logical circuit of each of these blocks, bistable *oc* is put into position 0, if it was not already there, through an "AND" gate unblocked by the conditions *t*4, *ti*10, *tj*0; in the same way, bistable *op* is put into position 0 through "AND" gates unblocked by the conditions *t*4, *ti*0 or *t*4, *tj*0 and an "OR" gate.

Then, the central logic circuit CLC (FIG. 1) causes the start of the block distributor DB and the associated scanner EXB. Normally, this scanner designates the output wire *exb*1 corresponding to the first block. At the receipt of the pulse given by the central logical circuit, the scanner EXB leaves the position 1 and makes a complete round; "AND" gates, inserted on the connections *flb*, are unblocked one after the other, which permits the central logical circuit CLC to test the various blocks. Connection *flb* corresponds to wires *oc*0, *oc*1, *op*1 (FIG. 2), which transmits to the central logical circuit the conditions of the bistables *oc* and *op*. As the central logical circuit finds the first compartment of the waiting row busy (bistable *oc* in 1), it tests the following one; the latter being free (bistable *oc in* 0), it deduces therefrom that it must seize this compartment, but earmark it as having "no priority." The rest of the operation is identical to that of the preceding case, with this only difference: that the central logic circuit controls the inscription of the indication 10 on the cores *toi, toj*. The second call has thus taken rank in the waiting row behind the first.

The later calls are inscribed after the preceding ones according to the same procedure.

When the last waiting row compartment becomes busy, the bistables *oc* of all the individual logical circuits are in position 1; the total busy bistable *ot* of the waiting row No. 1 (FIG. 3) passes to 1 through an "AND" gate unblocked by all the conditions *oc*1, the condition *t*4 and the condition *exm*1. If other calls take place, the central logical circuit by consulting the bistable *ot* of the waiting row No. 1, ascertains that there is no longer a free compartment. It then sets the scanner EXM on the calling supervision compartment and connects itself to the block containing this compartment (bistable *cn* in 1, FIG. 2). It then acts on the gates PT to unblock the conditions *t'*3 and *t'*4. At instant *t'*3, it controls the return to the rest condition of the bistable *ar* through a wire *fl*19, an "AND" gate unblocked by the conditions *t'*3 and *cn*1, the wire *eff*2 and an "OR" gate. At instant *t'*4, the condition of the bistable *ar* is carried onto the corresponding core *to*3 .Thus one knows that the call of the supervision compartment could not be noted in the waiting row, as there was no free compartment. The central logic circuit then controls the re-starting of the cycle scanner. The call will be served later as soon as there will be a free compartment in the waiting row; in practice, the wait will not exceed the duration of one cycle of scanner EXM, i.e., some ten milliseconds.

When the call concerns one of the two other common equipments of the installation, the equipment No. 2 e.g., the central logical circuit is informed thereof by the condition of the bistables *ap, aq* (*ap* in 1, *aq* in 0). It then directs the various scanners EXM on the transfer compartments CT2 constituting the waiting row No. 2. In these conditions, the scanner of the first block delivers the condition *exm*2 (FIG. 3) which prepares the operation of the bistables of the waiting row indicator No. 2.

Of course, the number of three common equipments is not at all limitative and as many waiting stores or rows as necessary can be foreseen.

FIG. 5 illustrates the procedure previously described. On this figure, the various compartments of the waiting row have been represented by squares bearing an indication characterizing the condition of the compartment (free compartment 00; busy compartment: 10; busy compartment with priority: 11). Shadings have been used to better distinguish the busy compartments from the free compartments and a small arrow to earmark the compartments with priority. In a first stage (row 1), all the compartments of the waiting store are free. In a second stage (row 2), the first compartment is occupied and it is marked with priority. The following call (stage No. 3) is inscribed in the scond compartment which is simply marked busy. The later calls take rank after the preceding ones, in the order that they present themselves (stages 4 and further). Finally, at the last stage or stage $n+1$, all the compartments of the waiting store are busy.

HANDLING OF CALLS INSCRIBED IN THE WAITING STORE

When a common equipment, marker MQ for instance, becomes free, bistable *dp* associated to this marker is in position 1 (FIG. 1). If there is at least one call pending in the waiting store or row, the corresponding bistable *fa* is also in position 1. In practice, the installation comprises most frequently two markers for safety reasons, but it is first of all assumed for simplification that there is but one marker. In this hypothesis, the connection marked by *x* is estabilshed and bistable *dp'* is suppressed as well as the related dotted lines connections. Bistables *fa* and *dp* act through an "AND" gate on the central logical circuit CLC; the latter is alerted and knows that it has to serve the oldest call inscribed in the waiting store No. 1. It stops the cyclic scanning, connects itself to marker MQ and sends a convenient code to the various scanners EXM through an "AND" gate unblocked by the condition *er* and an "OR" gate in order to set the scanners on the azimuth corresponding to the waiting row No. 1. Bistable *dp* passes to 0 to indicate that the marker is busy.

As indicated in the description of the inscription procedure for the calls, one proceeds with the reading of the transfer compartment CT1 and this in all the blocks at the same time. In each of them (FIG. 2) bistables *op* and *oc* are positioned accordingly (*oc* in 0 for a free compartment, *oc* in 1 for a busy compartment, *op* in 1 for a priority compartment); the corresponding data are transmitted to the block scanner banks through the wires *oc*0, *oc*1, *op*1 and the connection *flb*.

The block distributor DB and the corresponding scanner EXB (FIG. 1) are then started so as to successively test the waiting row compartments starting with the first. It will first of all be assumed that the priority call, i.e., that which is on top of the row, occupies compartment No. 1. The central logic circuit by testing wire *op*1 of the first block (FIG. 2), ascertains that bistable *op* is in position 1; it then decides to serve this priority call.

It then connects itself to the corresponding memory block BM*l*, by setting bistable *cn* to 1, then it controls the unblocking of the conditions *t*0 . . . *t*4 for the duration of one cycle of the distributor of DT. At instant *t*0, one proceeds with the reset to 0 of the reading bistables *ti, tj, tm . . . tn.* At instant *t*1, the "AND" gates inserted on the various reading wires *fl*7, *fl*9, *fl*11, *fl*13 are unblocked, in order to provide the indications carried by the cores *toi, toj, tom . . . ton* onto the corresponding bistables *tl, tj, tm . . . tn*; the bistables *ti, tj* both pass to 1 as the considered compartment has priority; the bistables *tm . . . tn* provide the address of the calling supervision compartment.

At instant *t*2, this address is transmitted to the central logic circuit which keeps it registered; the transmission is done through the wires *tm*1 . . . *tn*1, "AND" gates unblocked by the conditions *t*2 and *cn*1 and the wires *fl*29. During the instants *t*3, *t*4 and during the instants *t*0, *t*1, *t*2 of the following cycle, the central logic circuit works out its orders. At instant *t*3, it controls the restoring to zero of all the bistables *ti, tj, tm . . . tn,* through wire *fl*20, an "AND" gate unblocked by the conditions *t*3 and *cn*1, wire *eff*3, and "OR" gates connected to each of the bistables. At instant *t*4, "AND" gates inserted on the writing wires *fl*8, *fl*10, *fl*12, *fl*14 are unblocked in order to carry the indications given by the bistables *tl, tj, tm . . . tn* onto the corresponding cores *toi, toj, tom . . . ton*; the latter thus return to zero and the compartment is freed.

At the same time, the restoring to zero of bistable *cc* is controlled through an "AND" gate unblocked by the conditions *t*4, *ti*0, *tj*0; in the same way, the restoring to zero of the bistable *op* is controlled through "AND" gates unblocked by the conditions *t*4, *ti*0, *t*4, *tj*0 and an "OR" gate.

The central logical circuit is then disconnected from the first block (bistable *cn* in 0) to connect itself to the second (bistable *cn* in 1). It tests bistable *fa* (FIG. 3) in order to ensure that there is still at least one pending call in the waiting store. According to a variant, it could ascertain if the second compartment of the store is busy, by testing the condition of bistable *oc* (through a circuit not shown). At instant *t*3, it sends the priority busy indication (11) on the bistables *ti, tj,* through the wires *fl*21, *fl*22 without changing anything to the position of the other bistables *tm . . . tn.* At instant *t*4, the conditions of the bistables *ti, tj* are again copied on the corresponding cores *toi, toj,* which both pass to 1. The compartment is thus marked with priority; the call which occupied the second rank in the row takes the first place. In the corresponding individual circuit, the bistables *oc* and *op* are set to 1.

The registered address in the central logical circuit is transmitted to marker MQ (FIG. 1). The latter, by means of the first four bits, unblocks an "AND" gate by one of the conditions *nbl . . . nbn,* so as to connect itself with the reading and writing register RLE of the block containing the supervision compartment corresponding to the memorized address. It sends the last eight bits to the corresponding scanner EXM through an "AND" gate unblocked by the conditions *er'*, *nbl* and an "OR" gate so as to direct the scanner on the desired compartment. It may then work on this memory compartment, i.e., read information, fulfill logical operations and inscribe the information read or other information. In particular, it restores the cores *to*1, *to*2, *to*3 to zero.

When the first call is served and the marker is freed, bistable *dp* (FIG. 1) returns to position 1, the central logical circuit is again alerted and the priority call inscribed in the second waiting row compartment is served according to the same procedure. The various calls are thus treated successively in the order of inscription.

When the last call is served, the wires *oc*0 of all the individual logical circuits (FIG. 2) are brought to the characteristic potential indicating the condition 0 of the corresponding bistable, bistable *fa* of the waiting row (FIG. 3) is restored to the 0-position through an "AND" gate unblocked by all the conditions *oc*0, condition *t*4 and condition *exm*1.

By consulting this bistable, the central logical circuit concludes therefrom that all the calls are served; it makes the block scanner EXB return to 1 and controls the new start of the cyclic scanner.

The call handling procedure is illustrated by FIG. 6. In a first stage, all the compartments of the waiting store are busy, the first compartment having priority. At the second stage, the first call is served; the corresponding compartment is freed and it is the second compartment which now has priority. The same operation is continued at the next stages until stage *n* where there is only one call to be served. Finally, at the last stage or stage $n+1$, all the compartments of the waiting store are freed.

In the case where two markers are provided the connection indicated by X (FIG. 1) is to be suppressed, bistable *dp'* and the related dotted lines connections have to be provided. When a supervision compartment calls a marker, it has no particular reason to work with one rather than with the other; for the assembly of the two markers only one waiting row and only one bistable *fa* has thus to be provided. On the other hand, each of the two markers has its availability bistable (*dp* for the first marker, *dp'* for the second).

The inscription of a call in the waiting row does not set any particular difficulty and is effected as in the general case. Concerning the handling of a call, the operation is the following. If there is at least a call in the waiting row (bistable *fa* in 1) and if one marker at least is available (*dp* or *dp'* in 1), the central logical circuit is alerted through an "AND" gate and an "OR" gate unblocked by one of the two bistables *dp, dp'*. It connects itself by all appropriate means to an available marker; the rest of the operation is the same as in the case of a single marker.

On FIG. 8, the connection procedure of the central logic circuit CLC with the individual logical circuits CLI and the common equipments such as the markers MQ is represented. When the central logical circuit CLC wants to connect itself to the marker MQ to transmit data thereto, it unblocks an "AND" gate by means of wire *fl*30 so as to connect itself to the busbar BO1; in the same way, another "AND" gate is unblocked through the wire *fl*33 so as to connect marker MQ to the receiving bar BO2. The exchange of information may then be effected through the busbar BO1, the amplifier AP and the busbar BO2. To exchange information in the other direction, i.e., from marker MQ towards the central logical circuit CLC, one acts on two other "AND" gates through the wires *fl*31, *fl*32.

Concerning the individual logical circuits CLI, the central logic circuit CLC acts, as it has been indicated, by means of the connecting bistables *cn.* A same condition *cn*1 is foreseen to unblock the sending and receiving gates but this has no importance as distinct time positions are provided for each direction of information exchange.

As is clear from the preceding descriptions, the central logical circuit maybe solicited by the individual logical circuits as well as by the common equipment of the installation such as the markers. Of course, the central logic circuit can only treat one call at once. In FIG. 9, a diagram concerning the distribution procedure of these various calls on the central logical circuit is represented.

Normally, the device for working out orders ORD, integrated in the central logical circuit CLC, unblocks an "AND" gate by means of a wire *f*l34; the pulses *t*''0 emitted by the time distributor at each passage in position 0 make the distributor DA and the associated scanner EXM progress, the various compartments of the memory block BM*l* being then scanned in a cyclic manner. When an individual logical circuit CLI calls the central logical circuit, a signal delivered by this circuit through an "OR" gate, controls the setting of bistable *at* into position 1. The device for working out orders ORD informed of this change of position, blocks the "AND" gate which allowed the progression of the address distributor DA, and the cyclic scanning is stopped. At the same time, equipment ORD causes the start of the element distributor DO and the scanner EXO. The element distributor DO and the scanner EXO are constituted, as indicated, for the address distributor CA and the scanner EXM.

When the scanner EXO arrives in the position corresponding to the calling individual logical circuit CLI, an "AND" gate is unblocked by means of wire *f*l35, which permits the transmission of the calling signal of the individual logical circuit towards the equipment ORD through an "OR" gate and wire *f*l36. Due to this, equipment ORD blocks the element distributor DO and the associated scanner EXO on the position considered. At the same time, the signal present on wire *f*l36 unblocks the "AND" gate placed underneath the element distributor DO, the binary code staticized by the latter being then recorded in register RG which makes also part of the central logical circuit CLC. The latter is then connected to the calling individual logical circuit by controlling, as it has been indicated, the passage *to*1 of the connecting bistable *cn*.

When the call of the individual logical circuit has been proceeded with, the equipment ORD restores to 0 the stop bistable at and unblocks the "AND" gate permitting the restart of the address distributor DA.

When a marker MQ is available, its bistable *dp* is in 1 and when there exists at least a pending call in the corresponding waiting row, the bistable *fa* is also in 1. The two bistables *dp* and *fa* act in combination on an "AND" gate to deliver a calling signal on wire *f*l37 which controls the passage *to*1 of the stop bistable at through an "OR" gate; one has then been brought back to the preceding case.

The various calls which issue from the individual logic circuits as well as from the common equipments are thus treated successively by the central logical circuit. As no reset circuit is foreseen for the scanner EXO, these calls are handled without any preferential order.

By way of simplification, the detailed scheme of the central logical circuit part which operates in connection with the individual logical circuit has not been represented; such a scheme may be easily realized by those skilled in the art as at each stage of operation, the contents of the information sent and the orders worked out in accordance therewith has been indicated in a clear way. According to a known technique, either a cabled logic (matrices of diodes or of resistances), or a programmed logic may be used (previous inscription of a program on ferrite cores or any other similar support). Moreover, the other equipments represented on the general operation diagram of FIG. 1 (memories, scanners, read and write registers, gates) are well known.

It should be well understood that the preceding descriptions have only been given by way of a non-limitative example and that numerous variants may be realized without departing from the scope of the invention. One could replace the ferrite cores by different memories, provide scanners of another type, adopt other time diagrams, etc. In particular, the various numerical data have only been mentioned by way of example to facilitate the understanding of the operation and may vary for each particular case.

While the principles of the invention have been described above in connection with specific apparatus, it is to be clearly understood that this description is made only by way of example and not as a limitation on the scope of the invention.

We claim:

1. A selection system for systematically interconnecting individual ones of a plurality of junctors to common equipment,
said system comprising memory blocks for storing status information relative to said system,
central logic circuit means for controlling the operation of said system,
individual logic circuits associated with each memory block for controlling the operation of said memory blocks under the control of said central logic circuit means,
said memory blocks comprising supervisory storage compartments individual to each of said junctors,
said compartments having identifying addresses,
transfer stores having a plurality of transfer compartments in said memory blocks,
means for inscribing in said supervisory storage compartments the status of said individually associated junctors,
means responsive to any of said junctors requiring connection to said common equipment for inscribing the address of the said individually associated supervisory storage compartment in one of said transfer compartments in the order in which said junctors require connection, and
means for connecting said junctors to said common circuits in the order of said inscription.

2. The selection system of claim 1
wherein said common equipment comprises a plurality of types of equipment,
means for assigning said transfer stores to serve individual ones of said types of common equipment.

3. The selection system of claim 2
wherein said supervisory storage compartments comprises means for storing the identifying member of the common equipment required for connection by said associated junctor,
and means in said storage compartment indicating interconnection between said associated junctor and said required common equipment.

4. The selection system of claim 3
wherein said individual logic circuit comprises read and write register means for providing control marks for the supervisory compartments,
block scanner means individual to each of said blocks and controlled by said central logic circuit means,
means whereby said scanner means accomplishes a complete cycle from a marked position and thereby successively tests the marks of the compartments of the individual blocks.

5. The selection system of claim 4
wherein said transfer compartments comprise memory elements for indicating availability, busy and priority.

6. The selection system of claim 5,
means in said individual logic circuit means operated responsive to one of said supervisory storage compartments calling predetermined common equipment and when the said call has not yet been inscribed in the transfer compartment to cause the individual logic circuit of the corresponding block to refer to the central logic circuit,
means in said central logic circuit to stop the scanning, to direct the various scanners on the desired waiting supervisory storage compartment, to command the simultaneous reading of all the marks, to successively test all these marks by means of the block scanner, to choose the first idle transfer compartment which follows a busy one of said transfer compartments,
means for seizing said idle transfer compartment, and
means for recording the address of the calling supervisory storage compartment in the seized transfer compartment.

7. The selection system of claim 6,
means responsive to the individual logic circiut calling the central logic circuit, for causing the central logic circuit to scan the calling supervisory storage compartment.

8. The selection system of claim 7
wherein indicator means are provided associated with each transfer store,
said indicator means comprising a first and a second bistable,
said first bistable operating to indicate if there is at least one call pending in said transfer store,
said second bistable operating to indicate the total occupation of the transfer store,
and means responsive to the indication by said second bistable of the empty conditions of said transfer store for actuating said central logic circuit to seize the first transfer compartment of said empty transfer store and to provide said seized compartment with a priority indication.

9. The selection system of claim 8 including
means responsive to said common equipment becoming available,
and there being at least one calling supervisory storage compartment address recorded in said transfer compartments for alerting said central logic circuit,
means responsive to said central logic system being alerted for terminating the scanning and for connecting said scanning means to the transfer compartments for reading the information in said transfer compartments,
means for causing said central logic circuit to reseize the priority marked compartment,
and means for transferring the address recorded in the seized transfer compartment to said common equipment.

10. The selection system of claim 9
wherein said calling supervisory storage compartment's address in said transfer compartment comprises a first and a second group of bits,
said first group of bits arranged to indicate the memory block location of said calling supervisory storage compartment, and
said second group indicating the compartment within the block.

References Cited

UNITED STATES PATENTS

| | | | |
|---|---|---|---|
| 2,923,777 | 2/1960 | Schneider | 179—27.1 |
| 3,201,519 | 8/1965 | Schmitz | 179—18 |
| 3,231,680 | 1/1966 | Yamato et al. | 179—18.61 |

KATHLEEN H. CLAFFY, *Primary Examineer.*

L. A. WRIGHT, *Assistant Examiner.*